(12) United States Patent
Selberg

(10) Patent No.: US 6,641,639 B1
(45) Date of Patent: Nov. 4, 2003

(54) METHOD OF PRODUCING A BODY FOR ELECTRIC HEATING, AS WELL AS A BODY PRODUCED BY THE METHOD

(75) Inventor: Hans Selberg, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 71 days.

(21) Appl. No.: 10/049,024

(22) PCT Filed: Jul. 5, 2000

(86) PCT No.: PCT/SE00/01431

§ 371 (c)(1),
(2), (4) Date: Feb. 8, 2002

(87) PCT Pub. No.: WO01/12368

PCT Pub. Date: Feb. 22, 2001

(30) Foreign Application Priority Data

Aug. 12, 1999 (SE) ................................................ 9902886

(51) Int. Cl.⁷ .................................................. C22C 1/05
(52) U.S. Cl. ............................. 75/232; 419/8; 419/19; 419/23; 419/27; 419/29
(58) Field of Search ................................. 419/8, 19, 23, 419/27, 29; 75/232

(56) References Cited

U.S. PATENT DOCUMENTS

| | | | | |
|---|---|---|---|---|
| 2,846,339 A | * | 8/1958 | Dempsey | 427/77 |
| 3,031,340 A | * | 4/1962 | Girardot | 428/420 |
| 3,948,720 A | | 4/1976 | Reil | |

FOREIGN PATENT DOCUMENTS

| | | |
|---|---|---|
| EP | 0 687 215 B1 | 1/1999 |
| WO | 97/14547 | 4/1997 |

* cited by examiner

*Primary Examiner*—Ngoclan Mai
(74) *Attorney, Agent, or Firm*—Burns, Doane, Swecker & Mathis, L.L.P.

(57) ABSTRACT

Bodies for heating, for example electric sealing jaws, are produced according to the present invention by a method which includes compaction and densification or consolidation of pulverulent, metallic material in a mould. The mould (6) is first supplied with the pulverulent material (10) which is compacted, as well as treated with an impregnating solution (12). Thereafter, the body (2) is heated to dry the solution and to sinter the pulverulent material. The method gives a dense body possessing superior thermal conductivity.

21 Claims, 1 Drawing Sheet

METHOD OF PRODUCING A BODY FOR ELECTRIC HEATING, AS WELL AS A BODY PRODUCED BY THE METHOD

FIELD OF THE INVENTION

The present invention relates to a method of producing a body for electric heating by compaction and densification, or consolidation, of pulverulent, metallic material. The present invention also relates to a body for heating purposes comprising metal powder and produced in accordance with the method.

BACKGROUND OF THE INVENTION

Bodies for heating purposes, for example different types of sealing or welding jaws are regularly employed within a number of different branches of industry. Bodies for electric heating of different types of materials are thus employed inter alia within the packaging industry, in particular in the production of packaging containers of packaging laminates which consist of outer layers of thermoplastic, i.e. thermosealable material. Packaging laminates of this type are employed, for example, for producing packaging containers for various types of beverages, for example juice or milk. These packaging containers are created by folding and thermosealing of the thermoplastic material. The thermosealing procedure is such that two or more layers of the packaging laminate within the desired sealing zone are urged against one another with the aid of sealing jaws, of which at least one includes an electric conductor which makes for heating and thermosealing of the material. In connection with the compression of the packaging laminate layers, the sealing jaw is activated so that the mutually abutting, exteriorly thermoplastic layers are heated to softening temperature and partly fuse together. After a certain cooling time, the laminate layers within the sealing zone are sealed to one another in a durable and liquid-tight sealing joint or seam, and the sealing jaws may once again be distanced from one another so that the sealed laminate may be removed and replaced by new, as yet unsealed laminate portions. In packing and filling machines of modern design, the production of packaging containers takes place at high speed, and the resultant necessary high sealing rate renders it difficult to ensure satisfactory cooling of the sealing jaws in the time interval between two sequential sealing operations. In order to prevent the sealing jaws from becoming so hot that they prevent efficient cooling of the fused thermoplastic layers before the sealing jaws are distanced from one another, a cooling of the sealing jaws is therefore necessary. Normally, this takes place in that the sealing jaws are, in addition to the electrically conductive heating strip or coil, also provided with ducts for coolant fluid, normally water. Naturally, this renders both the manufacture of the sealing jaws proper and the overall packaging and filling machine more complicated.

The sealing jaw for electric heating in connection with, for example, the sealing of thermoplastic packaging materials is produced in a number of different ways, in a plurality of different configurations and different designs and constructions. Requirements common to sealing jaws of this type are that they must display high form precision, high durability to loading and good thermal conductivity. Since, moreover, it is also often required that the sealing jaw displays a relatively complicated configuration, sealing jaws are nowadays often produced using modern methods and techniques, for example by compacting powder metal material and subsequent sintering. This technique is per se well known and briefly comprises filling of powder metallic material into a suitable press mould, compaction of the material to the desired extent and subsequent heat treatment or sintering in order to cause the powder metal material to bond together and form a solid and configurationally stable body. The conductor necessary for electric heating may be placed in the mould before the metal powder and itself consist of powder metal material in the form of uninsulated metal particles of, for example copper, or be placed in a groove provided in the body of the sealing jaw. For further information within this area, reference is made to European Patent Specification EP 687.215.

In the production of bodies of pulverulent, metallic material, a compaction of the metal powder thus takes place in the mould. However, despite extremely high pressure it is impossible to compact the material to such an extent that the pulverulent metal particles wholly fuse together or are caused to totally fill out the space provided in the mould. In actual fact, there consequently always occur larger or smaller air-filled pockets or pores between the particles which, when the produced body is to be employed as a part of, for example, a thermosealing jaw, has proved to be a major disadvantage since the entrapped air serves as insulation and prevents the dissipation of heat through the body. As a result, the removal of excess heat and the emission of heat into the ambient surroundings are also prevented, and sealing jaws with bodies of powder metallic material therefore show a tendency, in lengthy intensive use, to be heated to a higher level than bodies in sealing jaws which are manufactured from a more homogeneous material. In this context, reference is made to PCT WO 97/14547 for further information. A known technique takes as its point of departure replacing the air-filled pockets with a plastic material (epoxy polymer), but this technique has only limited fields of use and is less suitable in connection with bodies for thermosealing jaws, since the plastic does not withstand the relatively high temperatures to which such a body is exposed in connection with continuous operation in a packing and filling machine.

There is thus a general need within the art disclosed by way of introduction to realise a method which makes for the production of a body of pulverulent, metallic material, the body having its pores located between the pulverulent metal particles filled with a thermally conductive and heat-resistant material.

SUMMARY OF THE INVENTION

One object of the present invention is to realise a method of producing a body for electric heating from pulverulent, metallic material, the method making it possible to fill out the pores occurring between the pulverulent metal particles with a thermally conductive, heat-resistant, hard and configurationally resistant material.

A further object of the present invention is to realise a method of the above-outlined type which makes it possible to select to degree to which the pores are filled.

Yet a further object of the present invention is to realise a method of the above-outlined type, the method being capable of being employed in the production of bodies for electric heating, i.e. bodies which contain prefabricated parts or space for such parts.

Still a further object of the present invention is to realise a method of the type indicated by way of introduction which makes it possible, in an integrated and efficient manner, to provide a body produced from metal powder with a homogeneous densification or consolidation material with properties which are particularly suitable for use in sealing jaws for electric heating.

The above and other objects have been attained according to the present invention in that a method of the type disclosed by way of introduction has been given the characterizing features that the pulverulent material is fed into a mould and compacted, that also an impregnating solution capable of being converted into a metal oxide is added, and that the body is thereafter heated to a temperature requisite for drying the impregnating solution and bonding the oxide to the pulverulent, metallic material.

Preferred embodiments of the method according to the present invention have further been given the characterizing features as set forth in appended subclaims 2 to 13.

The present invention also has for its object to realise a body for heating purposes, the body including, in accordance with the method according to the present invention, metal powder material possessing superior thermal conductivity.

A further object of the present invention is to realise a body for heating purposes, the body possessing superior thermal conductivity and such configurational consolidation and strength that it is well-suited for use in sealing jaws intended for electric heating.

Yet a further object of the present invention is to realise a body of the above-outlined type which possesses electrically insulating properties.

Still a further object of the present invention is to realise a body of the above-outlined type, the body accommodating an electrically conductive part.

The above and other objects have been attained according to the present invention in that a body of the type disclosed by way of introduction has been given the characterizing feature that it includes pulverulent, metallic material of iron of a particle size of less than 300 $\mu$m, and a ceramic material located between the particles.

Preferred embodiments of the body according to the present invention have further been given the characterizing features as set forth in appended subclaims 15 to 21.

As a result of the method and the body according to the present invention, a method and an apparatus will be realised which, in a rational manner, makes it possible to produce bodies for use, for example, in thermosealing jaws, the bodies possessing superior conductivity for heat, but poor conductivity for current. Hereby, the problem of accumulated heating which has hitherto created difficulties in rapid, repeated thermosealing in modem packing and filling machines is obviated. The production method makes it possible to fill-out, to the desired degree, pores in the body with a ceramic, thermally conductive material. The method further makes it possible to provide the body with an electric conductor or coil during a desired phase in the production process. After production, the body obtains the desired configurational accuracy and configurational stability and may be optionally subjected to further processing or mounting of additional, prefabricated parts.

BRIEF DESCRIPTION OF THE DRAWINGS

Preferred embodiments of both the method and the resultant body according to the present invention will now be described in greater detail hereinbelow, with particular reference to the accompanying Drawing, which shows only those parts indispensable to an understanding of the present invention. In the accompanying Drawing.

DETAILED DESCRIPTION OF THE INVENTION

Figure 1A:
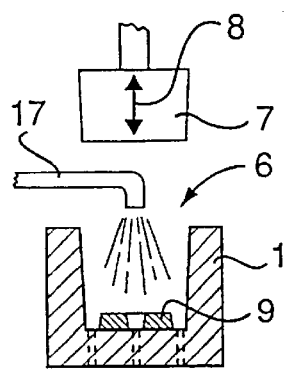
FIGS. 1A–E illustrate, schematically and in steps, the production method for a body in accordance with the present invention.

The preferred embodiment of a production method according to the present invention which is illustrated in FIGS. 1A–1E results in the production of a configurationally stable, well-defined body of an electrically non-conductive and thermally conducting material, which body may constitute a part of a plurality of objects with links to various fields of technology, e.g. different types ofjaws for heating purposes. The present case relates to and specifically describes the production of a body intended for electric heating, the body may for example, constitute the principle component of a sealing jaw provided with an electric conductor for thermosealing of thermoplastic material. Sealing jaws of this type are particularly employed in the manufacture of beverage packages of laminated plastic/paper material, the laminate comprising outer layers of thermoplastic material and, as a result, being capable of being sealed to itself or to other, preferably thermoplastic objects such as opening arrangements and the like. In these fields of practical application, it is of particular importance that the body utilised as the principle component in the sealing jaw lacks electric conductive properties but is nevertheless a good thermal conductor. Since bodies for use in sealing jaws must also be capable of withstanding pressure and jolts, and also possess superior configurational resistance, it has proved to be particularly suitable to produce such bodies using powder metallurgy techniques (so-called sinter metals). However, this technique is fundamentally well-known and will not, therefore, be described in detail in this context. The technique affords a configurationally stable, mechanically strong body which, depending upon the nature of the selected metal powder (type of metal, insulated or uninsulated particles and particle size, etc.) and density, results in a body possessing superior electrically conductive properties or as good as total insulating properties. All bodies manufactured by metal powder metallurgy techniques however display more or less large interspaces or porosities between individual metal powder particles. Even when it is ensured—in order to maximise the thermal conductivity of the body—that the metal powder particles are densely packed so that the body has high density, porosities will still occur and negatively affect the thermal conductivity of the body. It is known in the art to fill-out the interspaces or pores with the aid of, for example, plastic materials such as epoxy resin, but when the body is to be employed at relatively high temperatures, the plastic material used as the filler in the body will be subjected to the effects of elevated temperature and may possibly melt, which of course is unacceptable. The method according to the present invention describes a technique which makes it possible, to the desired extent, to control and fill-out the porosities of the body with the aid of a heat-resistant, configurationally stable and readily handleable filler material which, moreover, displays a certain thermal conductivity and is electrically insulating, namely a ceramic material. A first embodiment of the preferred method will be described below.

Figure 1B:
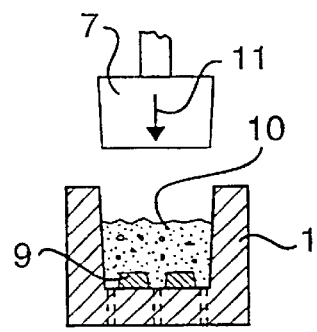
Figure 1C:
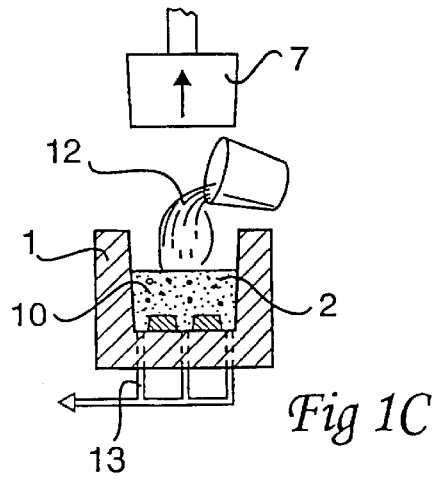
Figure 1D:
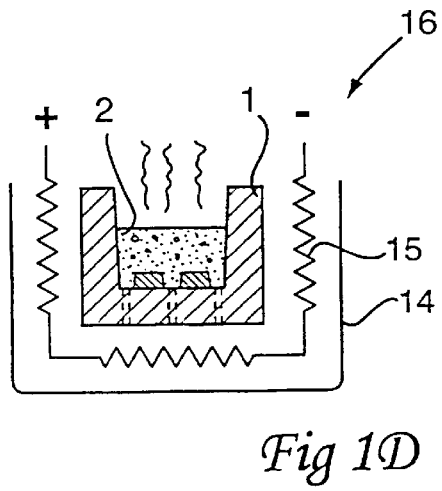
Figure 2:
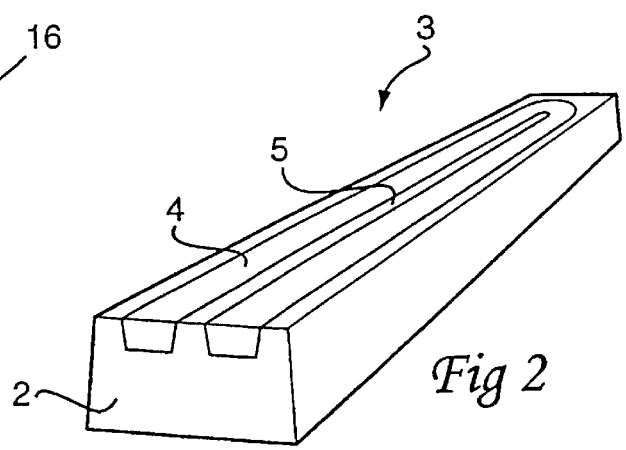
FIG. 2 shows a per se known sealing jaw including a body according to the present invention.

FIGS. 1A–1D show a mould half 1 for producing a body 2 for a sealing jaw 3 illustrated in FIG. 2. The sealing jaw includes, in addition to the body 2, also an electric conductor or coil 4 which is U-shaped and preferably extends with its shanks in the longitudinal direction of the body 2 and is accessible at both ends for connection to a source of electric current. The conductor 4 is preferably placed in immediate association with a work surface 5 on the sealing jaw 3. The work surface is preferably surface ground and a part of the work surface consists of the conductor 4 inlaid in the body 2. The work surface 5 is possibly covered with one or more insulating layers of suitable type (not visible in FIG. 2).

The mould half 1 shown in FIG. 1 includes an elongate mould 6 which is adapted to the configuration and size of the body 2. An upper mould half 7 serves as a ram tool which, in accordance with that indicated by the arrow 8 (FIG. 1A) is vertically reciprocal between an upper position a distance from the mould half 1 and a lower position in which the upper mould half 7 partly extends down into the mould 6 of the lower mould half 1. FIG. 1A also shows how a filler body 9 is placed at the bottom of the mould 6. The filler body 9 may possibly consist of the conductor 4, which will be described in greater detail below. Other parts, such as anchorages, tubes or the like which are to be integrated in the body may be placed beforehand and fixed in the mould 6.

FIG. 1B shows how the mould 1 has been partly filled (via a filler pipe 17, FIG. 1A) with a pulverulent material 10 (metal powder), as well as how the upper mould half 7, as indicated by the arrow 11, has been displaced downwards in order to compact the pulverulent material 10 in the lower region of the mould 6.

FIG. 1C schematically illustrates how a second material, e.g. an impregnating solution 12, is supplied to the mould 6. Schematically indicated ducts 13 are connectable to a partial vacuum source of known type (not shown).

FIG. 1D shows how the body 2 located in the mould half 1 is heated by means of heating device 16 which, for example may include electric resistor elements 15 or other per se known heating devices. Preferably, there is also provided a surrounding, insulating heat shield 14.

Figure 1E:
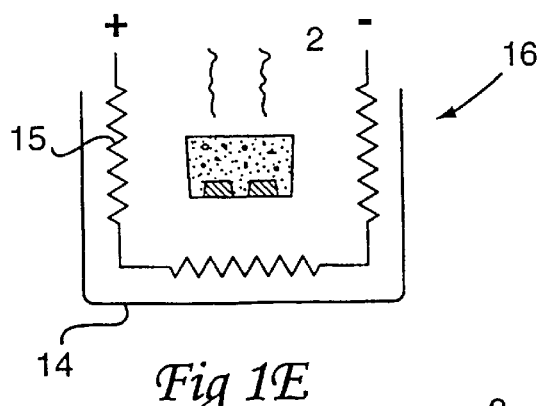

FIG. 1E illustrates how the compacted body 2, possibly after having once again (one or more times, usually several cycles are repeated) been supplied with the second material (in accordance with FIG. 1C) is mechanically lifted up and subjected to a supplementary treatment or final hardening with the aid of the heat elements 15. Naturally, other types of per se known heating devices may occur, as well as various other different devices of mechanical or pneumatic type for handling the body 2, handling/dosing of the components forming the body 2 and sensing and regulating the pertinent temperatures. Only as regards those parts which deviate from that which is the norm within metal powder technology will more detailed information be provided below. Otherwise, reference is made to technology within this area known by persons skilled in the art.

When a first, preferred embodiment of the method according to the present invention is utilised for producing the body 2 for the sealing jaw 3, a prefabricated conductor 4 acting as the filler body 9 is first placed in the bottom of the mould 6. Possibly, the conductor 4 is fixed in some suitable manner in the desired position in relation to the mould half 1 so as not to be affected or displaced in subsequent processing stages. In this position, the upper mould half 7 acting as the ram is in its upper position, which gives free access from above to the mould 6 which, thereafter, is filled via the filler pipe 17 with the pulverulent, metallic material 10. Preferably, the pulverulent material includes of particles of iron (Fe) which have a particle size of less than 300$\mu$m. More precisely, the particles have a mean particle size of between 20 and 150$\mu$m and preferably use is made of metallic iron powder possessing a mean particle size of approx. 35$\mu$m. The smaller the particle size, the higher will be the degree of packing, which is suitable given that, for reason of thermal conductivity, the intention is to have a maximum quantity of metal in the body. Correspondingly, larger particles give more porosities and thereby a greater possibility to maximise the quantity of densification agent in the finished body. The particles may display some form of surface insulation, they may, for example, be coated with a thin surface layer of iron oxide. This oxidation layer entails that each particle is electrically insulated from its ambient surroundings, for which reason the body subsequently formed from the metal powder will have electrically insulating properties. Also other kinds of particles may be used in various combinations, i.e. particles of ceramics or diamond in order to give the finished body the desired properties. Once the pulverulent material 10 has been fed into the mould 6 to the desired level, compaction of the material takes place, preferably in that the upper mould half 7 is activated and begins a downwardly directed movement as indicated by means of the arrow 11 (FIG. 1B). Preferably, the mould half 7 is, in order to make possible this movement, connected to a prime mover of conventional type, for example a mechanical/electric prime mover. The mould half 7 is thereafter displaced downwards to a predetermined turning position, in which the desired compaction of the pulverulent material 10 located in the mould 6 is achieved. As one alternative or supplement to the compacting function of the mould half 7, it is also possible to vibrate the mould half 1 to such a degree that the desired packing or compaction of the metal powder particles located in the mould 6 is obtained. Naturally, a combination of these methods may also be employed, the cardinal feature being merely that the pulverulent material 10 obtains the desired compaction degree in a homogeneous method.

As will be apparent from FIG. 1C, the mould 6 is fed thereafter with the densification agent in the form of an impregnating solution 12 which is caused to penetrate into the pulverulent material 10. This may possibly be facilitated in that the vacuum ducts 13 are connected to a source of partial vacuum, so that a certain partial vacuum occurs in the cavities or porosities which still exist after the compaction operation between the individual mutually abutting metal particles in the mould 6. The impregnating solution includes a liquid, preferably water, as well as a chemical substance of a type which is possible to (thermochemically) convert into a metal oxide, for example aluminium nitrate ($AlNO_3$), which when heated to a suitable temperature will convert into aluminium oxide ($Al_2O_3$). As a binder phase also for example some type of chromium ($Cr_2O_3$) compound or other per se known mixtures of metal oxide can be used.

In a subsequent step (FIG. 1D), the thus formed body 2 is subjected, while still remaining in the mould half 1, to a drying and/or heating operation to a temperature below boiling temperature of water, which may take place, for example, with the aid of hot air or with the aid of the elements 15. In such instance, the water content of the impregnating solution will be vaporised so that only that residue of the impregnating solution remains that later, at an elevated temperature, will convert into a metal oxide in the pores of the body 2. The body 2 may thereafter once again be treated with the impregnating solution 12, preferably in that the procedure illustrated in FIG. 1C is repeated, i.e. the ducts 13 are once again placed in communication with the source of partial vacuum and additional solution 12 is added and allowed to penetrate into the remaining, as yet unfilled pores. Thereafter, renewed drying and evaporation take place to remove the water content of the impregnating solution 12. The body is reheated after each treatment with the impregnating solution and this multi cycle densification process of the body may last until the major part of the pores are filled with the substance in question. Typically, this procedure may thereafter be repeated a number of times (5–10 times) until the desired infiltration and filling degree have been ensured.

Finally (FIG. 1E), the body 2 is removed from the lower mould half 1 and subjected to an additional heating to a higher temperature (the word "sintering" is used only to define this additional heating process), which ensures that the body is hardened and obtains the desired hardness and configurational stability. Preferably, the body is, in such instance, heated to a temperature of between 200 and 600° C. As a result, the powder metal particles included in the body and compacted closely to one another are permanently interconnected to one another at the same time as any possible residual liquid from the impregnating solution is vaporised. Typically, heating takes place to a temperature in excess of 300° C., this temperature being maintained for a period of approx. 15 minutes. This value is typical for production of bodies for a sealing jaw, but of course the necessary heating time is dependent on the size and form of the body. It is important that the heating time is long enough to ensure a uniform heating throughout the complete body. The vaporisation of the liquid fraction of the solution and the heating operation intended to harden the pulverulent material may possibly take place in sequence such that the drying of the solution and hardening of the body take place progressively by means of a temperature increase to the desired temperature, preferably in excess of 300° C. This is suitable when the desired infiltration and filling degree of the ceramic material in the body is relatively low and no repetition of the production stages in FIGS. 1C and 1D is necessary. It is to be observed that no "sintering" in the general sense of the word takes place, i.e. the metallic powder is not heated to such an extent that the powder particles adhere to each other solely by diffusion. The binding between the particles is instead achieved by means of the ceramic binding created by the heating of the impregnating solution.

The described production method may also be utilised for manufacturing bodies which include prefabricated recesses for adaptation to separately manufactured parts of different types, for example electric conductors, anchorage devices or other connections. In such instance, according to a second embodiment of the method according to the present invention, a number of filler bodies 9 of suitable configuration may be placed in the mould 6 prior to the supply of the pulverulent material 10. In this instance, the filler bodies 9 must, like the mould 6, be provided with some clearance, i.e. the substantially vertically extending surface in the Figures must have a slope (typically 1–3°) which makes it possible to remove the formed body 2 out of the mould and remove the filler bodies 9 out of the formed body 2. The recesses in the body realised by means of the filler bodies are thereafter utilised for placing and connecting the prefabricated parts with the body. This may be put into effect before or after the heat treatment of the body, and possibly some additional processing operations of the body and/or the parts placed in it may be put into effect by a conventional grinding process. This method is often employed in the production of sealing jaws since these must normally have a smooth ground work surface with an embedded conductor of, for example, copper. Moreover, the work surface may, after the grinding operation, be provided with an electrically insulating layer, for example of ceramic coating or an oxide of some form.

As a further alternative production method, mention might be made of the method which is described in European Patent EP 687215 in which a sealing jaw is produced from two pulverulent materials, namely a material with electrically surface insulating particles for producing the body of the sealing jaw and a second, pulverulent metal material with uninsulated, electrically conductive particles of, for example, copper. In such instance, the electrically conductive material is caused to form a strand partly embedded in the body and forming a conductor extending adjacent to the work surface of the body, the conductor being electrically accessible at both ends for connection to a current source. In such instance, the body is first produced in the above-described manner in that metal powder is fed into a mould provided with filler body and compacted, whereafter the impregnating liquid is added and the body is heated for drying and hardening. After possible repeated treatment with the densification agent, the recess formed by the filler body is filled with pulverulent material including, for example, uninsulated copper particles which are compacted and heat treated or sintered in a per se known manner. This technique affords considerable freedom as regards forming conductors with, for example, irregular configuration or varying cross section.

As was mentioned earlier, it is often desirable, in the production of bodies which are to form the principle component in a heat sealing jaw, to maximise the proportion of iron in the body material. This may preferably be achieved in that a pulverulent material with the smallest possible particle size is selected, whereafter the theoretical maximum quantity of particles for the relevant mould is calculated. Thereafter, the pulverulent material is mixed with a surplus of water or impregnating solution and poured into a mould with elevated edges. The particles will now progressively sediment at the lower region of the mould, a process which may be accelerated by subjecting the mould to vibration. Surplus liquid is thereafter removed and, after possible supplementary compacting and impregnation of the thus formed body, the residual surplus liquid may be heated off and the body hardened by heating to the previously mentioned temperatures. In practice, this method has proved suitable for the production of sealing jaws with inlaid, prefabricated conductors of copper material.

The impregnating liquid may, depending on the use of the specific body that is treated, be of a composition specifically selected to give the body the desired performance or properties and include for example substances or particles (clay) to form a slurry that gives the treated body an abrasive effect or, on the contrary, low friction properties. The impregnating step may also be performed after the body is removed from the mould, and also the compacting step or steps may be performed outside the moulding tool and in a separate process, for example by HIP or CIP treatment (Hot Isostatic Pressing and Cold Isostatic Pressing, respectively).

As a result of the invented method, it will be possible to produce bodies with dramatically improved mechanical strength and increased resistance to wear, these properties both being extremely advantageous when the bodies are to be employed as the principle component in sealing jaws for electric heating. When the body is manufactured with a recess in which a prefabricated conductor is later placed, the production method may also be utilised for realising electric insulation of the conductor with the aid of the ceramic coating. Sealing jaws of the type produced with the aid of a body manufactured in accordance with the present invention contain no plastic or other material which melts at relatively low temperatures and can, therefore, be employed up to extremely elevated temperatures of the order of approx. 800° C. The method finally makes it also possible in a simple manner to vary the proportion of metal in the formed body, which may be employed to regulate the permeability of the material without any appreciable affect on the thermal conductivity of the body, since the ceramic filler material also possesses a relatively good thermal conductivity.

What is claimed is:

1. A method of producing a body for a heat sealing jaw by compaction and densification, or consolidation, of pulverulent, metallic material, the method comprising feeding the pulverulent material into a mould and compacting the pulverulent; and adding an impregnating solution capable of being converted into a metal oxide; and heating the body to a temperature requisite to both dry the impregnating solution and bond the oxide to the pulverulent, metallic material.

2. The method as claimed in claim 1, wherein the pulverulent material, after having been fed into the mould, is compacted by vibration.

3. The method as claimed in claim 1, wherein the pulverulent material, after having been fed into the mould, is compacted by mechanical pressing.

4. The method as claimed in claim 1, wherein the infiltration of the impregnating solution in the body is facilitated by subjecting the body to a partial vacuum.

5. The method as claimed in claim 1, wherein the body, after supply of the impregnating solution during a first period of time, is heated to a first temperature for drying the solution and thereafter to a second, higher temperature for hardening the body by conversion of the impregnating solution.

6. The method as claimed in claim 5, wherein both the drying of the impregnating solution and hardening of the body take place in sequence in that the body is subjected to a heating to between 200 and 600° C.

7. The method as claimed in claim 1, wherein a prefabricated part is placed in the mould prior to the addition of the pulverulent material.

8. The method as claimed in claim 3, wherein the body is, after the mechanical pressing, connected to a prefabricated part.

9. The method as claimed in claim 1, wherein one or more of the production stages is repeated.

10. The method as claimed in claim 7, wherein the produced body and/or the prefabricated part are subjected to a subsequent, mechanical final processing.

11. The method as claimed in claim 1, wherein the solution includes a liquid, thermally convertible into a ceramic material.

12. The method as claimed in claim 11, wherein the impregnating solution includes ceramic particles with a particle size of at most 10 μm.

13. The method as claimed in claim 11, wherein a metal oxide is used as binder phase.

14. A body for a heat sealing jaw comprising sintered metal powder material and produced in accordance with the method as claimed in claim 1, wherein it includes pulverulent, metallic material of iron with a particle size of less than 300 μm, as well as a ceramic material located between the particles.

15. The body as claimed in claim 14, wherein the particles have a mean particle size of between 20 and 150 μm.

16. The body as claimed in claim 15, wherein the metal powder has a mean particle size of 35 μm.

17. The body as claimed in claim 14, wherein the particles are coated with a thin oxidation layer.

18. The body as claimed in claim 14, wherein it includes an electric conductor.

19. The body as claimed in claim 18, wherein it includes a work surface along which the conductor extends.

20. The body as claimed in claim 19, wherein the conductor or the work surface is covered by an outer, insulating layer.

21. The body as claimed in claim 18, wherein the conductor comprises pressed, uninsulated metal powder.

* * * * *